US010115538B2

(12) United States Patent
Wang

(10) Patent No.: US 10,115,538 B2
(45) Date of Patent: Oct. 30, 2018

(54) LIGHT-PERVIOUS BICOLOR KEY CAP

(71) Applicant: TAIWAN TAI-HAO ENTERPRISE CO., LTD., New Taipei (TW)

(72) Inventor: Min-Hsueh Wang, New Taipei (TW)

(73) Assignee: TAIWAN TAI-HAO ENTERPRISE CO., LTD., New Taipei (TW)

(*) Notice: Subject to any disclaimer, the term of this patent is extended or adjusted under 35 U.S.C. 154(b) by 0 days.

(21) Appl. No.: 15/788,839

(22) Filed: Oct. 20, 2017

(65) Prior Publication Data

US 2018/0182574 A1 Jun. 28, 2018

(30) Foreign Application Priority Data

Dec. 23, 2016 (CN) ..................... 2016 2 1425044 U

(51) Int. Cl.
*G01D 11/28* (2006.01)
*H01H 13/02* (2006.01)
*F21V 3/06* (2018.01)

(52) U.S. Cl.
CPC ........... *H01H 13/023* (2013.01); *F21V 3/062* (2018.02); *H01H 2219/036* (2013.01); *H01H 2219/054* (2013.01); *H01H 2223/038* (2013.01)

(58) Field of Classification Search
CPC ........... H01H 13/023; H01H 2219/036; H01H 2219/054; H01H 2223/038; F21V 3/062
USPC ........................................................ 362/23.03
See application file for complete search history.

(56) References Cited

U.S. PATENT DOCUMENTS

| | | | | |
|---|---|---|---|---|
| 7,883,239 B2 * | 2/2011 | Rains, Jr. | F21S 2/00 | 250/228 |
| 9,022,606 B2 * | 5/2015 | Radl | F21V 7/0008 | 362/231 |
| 2007/0045524 A1 * | 3/2007 | Rains, Jr. | F21S 2/00 | 250/228 |
| 2007/0138978 A1 * | 6/2007 | Rains, Jr. | F21S 2/00 | 315/291 |
| 2007/0235639 A1 * | 10/2007 | Rains, Jr. | H05B 33/0863 | 250/228 |
| 2010/0172152 A1 * | 7/2010 | Boonekamp | F21V 7/0008 | 362/609 |
| 2012/0051041 A1 * | 3/2012 | Edmond | F21S 8/026 | 362/231 |

* cited by examiner

*Primary Examiner* — Bryon T Gyllstrom
(74) *Attorney, Agent, or Firm* — Guice Patents PLLC

(57) ABSTRACT

A light-pervious bicolor key cap includes: a key frame, having a first color and formed with plural thin ribs, wherein front ends of the plural thin ribs are formed with at least one letter or punctuation in a continuous status without any notch; and a cap cover, having a second color, wherein the letter or punctuation is formed on a surface of the cap cover, an outer side of the cap cover is formed with a material filling protrusion allowing a plastic having the second color to be filled in, and an inner surface thereof is formed with at least one convex piece which is not fixedly combined with the key frame; so that through removing the convex piece having the second color, the letter or punctuation of the cap cover is prevented from being formed with any notch and capable of allowing the light to fully permeate.

4 Claims, 4 Drawing Sheets

LIGHT-PERVIOUS BICOLOR KEY CAP

BACKGROUND OF THE INVENTION

1. Field of the Invention

The present invention relates to light-pervious bicolor key cap, especially to a light-pervious bicolor key cap having a cap cover with a material filling protrusion at a lateral side and a convex piece at an inner side, and a letter or a punctuation in a continuous status is formed on the cap cover.

2. Description of Related Art

Quite a few of tools or means for inputting data are provided in the prior art, and there is no doubt that a keyboard, for example used in a computer, is mostly adopted, thus the keyboard is a must have equipment among the hardware for assembling a computer, the reason is that consumers have already gotten used to the conventional typing operation.

The key switches in a keyboard can be categorized into a mechanical type and a membrane type; for satisfying the trend of being lighter, thinner, shorter and smaller, the membrane type and an electric-conductive rubber are mostly adopted for gradually replacing the mechanical type. The principle of the membrane type is that: a material filing protrusion formed in the electric-conductive rubber is pressed for being in contact with a connecting joint formed on a printed membrane circuit disposed below for achieving an objective of inputting a command.

Referring to FIG. 1, which a schematic view illustrating the structure of a conventional light-pervious bicolor key cap. As shown in FIG. 1, the bicolor key cap 300 includes a cap cover 310, the cap cover 310 is formed with at least one letter or one punctuation 311, and the letter or the punctuation 311 is formed with a notch 312; during an injection molding treatment, a plastic having a second color is provided from the rear end of the notch 312 for being introduced on a surface of the key cap 300 so as to allow the letter or the punctuation 311 (for example but not limited to the letter A) to be formed; when a backlight source (not shown in figures, for example but not limited to a light-emitting diode) is used for emitting the light from the bottom end of the key cap 300, the notch 312 allows the light to permeate which causes the letter or the punctuation 311 to be provided with a poor appearance; as such, the disadvantages shall be improved.

Accordingly, a novel light-pervious bicolor key cap for overcoming the above-mentioned disadvantages shall be provided.

SUMMARY OF THE INVENTION

One primary objective of the present invention is to provide a light-pervious bicolor key cap, which includes a key frame having a first color and formed with a plurality of thin ribs , and the front ends of the plural thin ribs are formed with at least one letter or one punctuation in a continuous status, a plastic having a second color is provided through being filled from a filling hole at a lateral side of a second mold, so that the letter or the punctuation can be formed on a surface of a cap cover having the second color.

Another objective of the present invention is to provide a light-pervious bicolor key cap, wherein a letter or a punctuation is not formed with any notch, thereby allowing the letter or the punctuation to be provided with a better appearance when the light is permeating through.

For achieving said objectives, the present invention provides a light-pervious bicolor key cap, which includes: a key frame, having a first color and formed with a plurality of thin ribs, wherein front ends of the plural thin ribs are formed with at least one letter or one punctuation, and the letter or the punctuation is formed in a continuous status without any notch; and a cap cover, having a second color, wherein the letter or the punctuation is formed on a surface of the cap cover so as to form a bicolor key cap, an outer side of the cap cover is formed with a material filling protrusion allowing a plastic having the second color to be filled in, and an inner surface of the cap cover is formed with at least one convex piece located below the letter or the punctuation, and the plastic having the second color is allowed to pass two sides defined at the bottom end of the convex piece having the first color for enabling the convex piece having the second color to be formed, and the convex piece having the second color is not fixedly combined with the key frame in a fused or molten fashion; so that through removing the convex piece having the second color, the letter or the punctuation of the cap cover is prevented from being formed with any notch and capable of allowing the light to fully permeate.

For fully disclosing the structure, the characteristic and the objective of the present invention, one preferred embodiment with reference to figures is provided hereinafter for detailed illustration.

DETAILED DESCRIPTION OF THE PREFERRED EMBODIMENT

Figure 1:
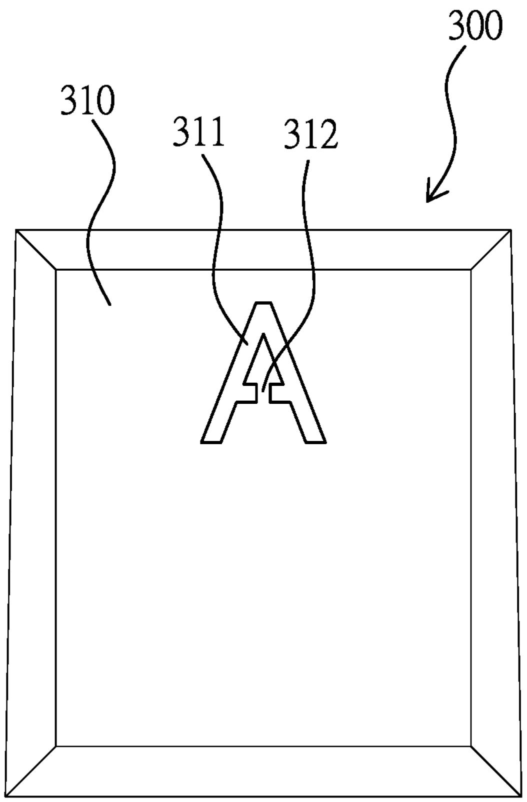
(PRIOR ART) FIG. 1
FIG. 1 is a schematic view illustrating the structure of a conventional light-pervious bicolor key cap.
Figure 2:
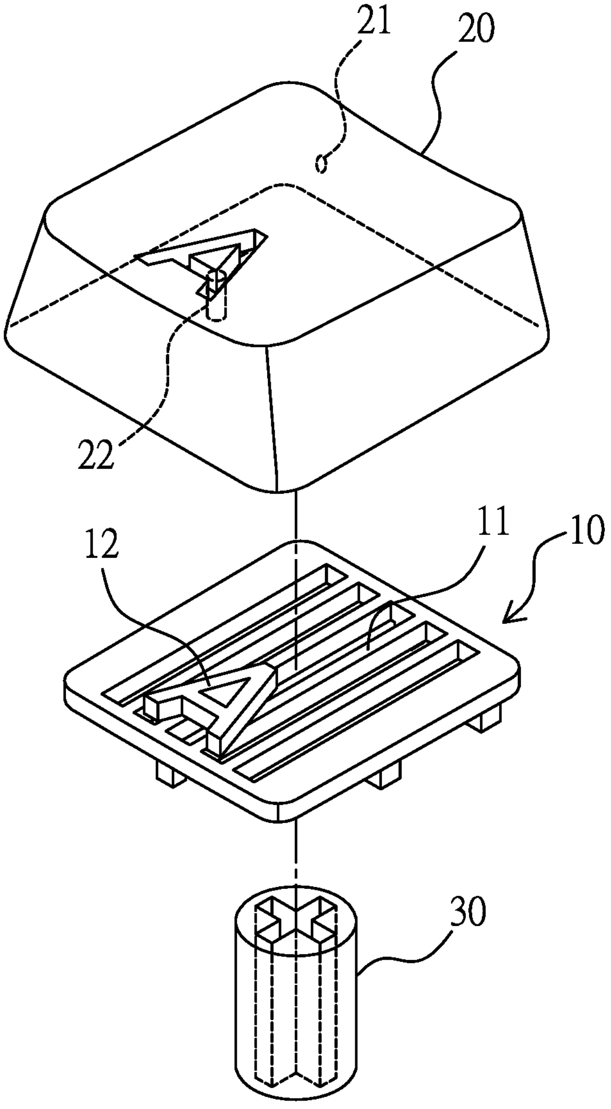
FIG. 2 is an exploded view illustrating the light-pervious bicolor key cap according to one preferred embodiment of the present invention.
Figure 3:
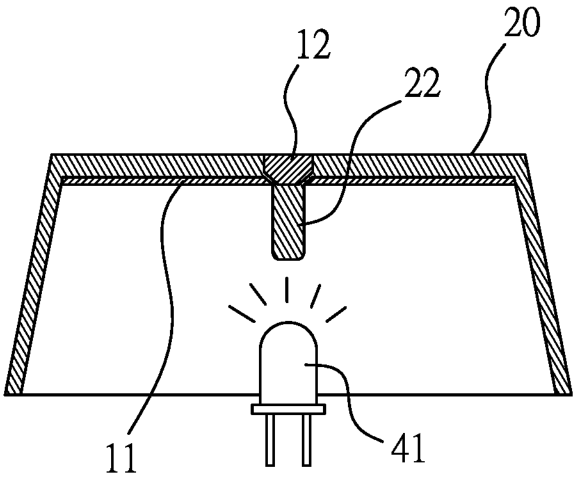
FIG. 3 is a cross sectional view illustrating a light permeating status after the light-pervious bicolor key cap being combined with a backlight source according to one preferred embodiment of the present invention.
Figure 4:
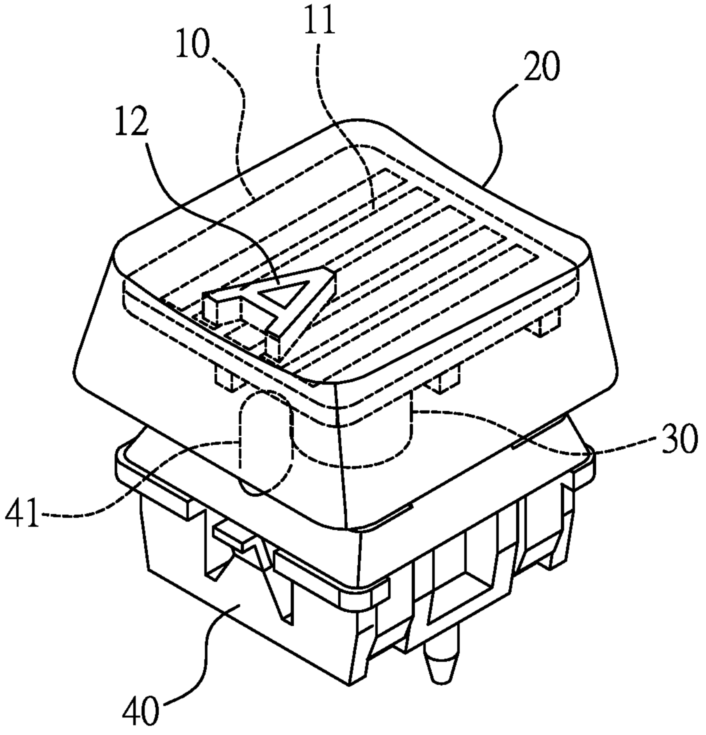
FIG. 4 is a schematic view illustrating the light-pervious bicolor key cap being combined with a switch seat according to one preferred embodiment of the present invention.

Referring from FIG. 2 to FIG. 4, wherein FIG. 2 is an exploded view illustrating the light-pervious bicolor key cap according to one preferred embodiment of the present invention; FIG. 3 is a cross sectional view illustrating a light permeating status after the light-pervious bicolor key cap being combined with a backlight source according to one preferred embodiment of the present invention; and FIG. 4 is a schematic view illustrating the light-pervious bicolor key cap being combined with a switch seat according to one preferred embodiment of the present invention. The present invention provides a light-pervious bicolor key cap.

As shown in figures, according to one preferred embodiment of the present invention, the light-pervious bicolor key cap includes a key frame 10, a cap cover 20 and a cap column 30.

The key frame 10 is provided with a first color and formed with a plurality of thin ribs 11, and the front ends of the plural thin ribs 11 are formed with at least one letter or one punctuation 12, and the letter or the punctuation 12 is formed in a continuous status without any notch. Wherein, the first color is a light-pervious color for example but not limited to red, pink, green or blue, the amount of the plural thin ribs 11 is for example but not limited to three, and the letter or the punctuation 12 is in the continuous status, so that the letter or the punctuation 12 can be prevented from being formed with any notch or opening after being molded with an injecting means.

The cap cover 20 is provided with a second color, the letter or the punctuation 12 is formed on a surface of the cap cover 20, thereby forming a bicolor key cap. Wherein, the second color is for example but not limited to black or white, and an outer surface of the cap cover 20 is formed with a material filing protrusion 21 for allowing a plastic having the second color to be filled, and an inner surface of the cap cover 20 is formed with at least one convex piece 22 located below the letter or the punctuation 12, the plastic having the second color is allowed to pass two sides defined at the bottom end of the convex piece 22 for enabling the convex piece 22 having the second color to be formed, and the convex piece 22 having the second color is not fixedly combined with the key frame 10 in a fused or molten fashion; if the convex piece 22 is not removed, a light source would be blocked by the convex piece 22 and at least one notch could be formed on the letter or the punctuation 12. As such, through removing the convex piece 22 having the second color, the letter or the punctuation 12 of the cap cover 20 is prevented from being formed with any notch and capable of allowing the light to fully permeate.

As shown in FIG. 2, according to this embodiment, there is one convex piece 22 being adopted for the purpose of illustration, but what shall be addressed is that the scope of the present invention is not limited to the above-mentioned arrangement, two of the convex pieces 22 can be respectively disposed at the two sides defined at the bottom end of the letter or the punctuation 12. Wherein, the plastic having the first color is a plastic having a light-pervious color for example but not limited to red, pink, green or blue; the plastic having the second color is for example but not limited to a plastic with black or white color. The cap column 30 is also provided with the second color, disposed below the key frame 10 and used for being combined with a switch seat 40. The switch seat 40 includes a backlight source 41, and the backlight source 41 is for example but not limited to a light-emitting diode.

As shown in FIG. 3, when being assembled, the convex piece 22 having the second color is firstly removed from the cap cover 20, so that a light source emitted by the backlight source 41 is prevented from being blocked by the convex piece 22, and the letter or the punctuation 12 can be prevented from being formed with any notch and capable of allowing the light to fully permeate.

As shown in FIG. 4, after being assembled, when the bicolor key cap is pressed, the backlight source 41 of the switch seat 40 is actuated to emit the light source, and the light source is able to penetrate the letter or the punctuation 12 having the first color and to be shown on the surface of the cap cover 20. Because the key frame 10 is formed with the plural thin ribs 11, the light source emitted by the backlight source 40 is not blocked by the thin ribs 11, so that the light-pervious property of the letter or the punctuation 12 on the surface of the cap cover 20 can be more even and more specified; and the letter or the punctuation 12 on the cap cover 20 is not formed with any notch, so that a letter or punctuation having a better appearance can be provided when the light is permeating through. Based on what has been disclosed above, the light-pervious bicolor key cap provided by the present invention is novel and more practical in use comparing to the conventional light-pervious bicolor key cap.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A light-pervious bicolor key cap, including:

a key frame, having a first color and formed with a plurality of thin ribs, wherein front ends of said plural thin ribs are formed with at least one letter or one punctuation, and said letter or said punctuation is formed in a continuous status without any notch; and a cap cover, having a second color, wherein said letter or said punctuation is formed on a surface of said cap cover so as to form a bicolor key cap, an outer side of said cap cover is formed with a material filling protrusion allowing a plastic having said second color to be filled in, and an inner surface of said cap cover is formed with at least one convex piece located below said letter or said punctuation, and said plastic having said second color is allowed to pass two sides defined at a bottom end of said convex piece for enabling said convex piece having said second color to be formed, and said convex piece is not fixedly combined with said key frame; so that through removing said convex piece, said letter or said punctuation of said cap cover is prevented from being formed with any notch and capable of allowing light to fully permeate.

2. The light-pervious bicolor key cap as claimed in claim 1, wherein said plastic having said first color is a plastic having red, pink, green or blue color.

3. The light-pervious bicolor key cap as claimed in claim 1, wherein said plastic having said second color is a plastic having black or white color.

4. The light-pervious bicolor key cap as claimed in claim 1, wherein a cap column is further formed below said key frame.

* * * * *